Sept. 16, 1941.  E. K. BENEDEK  2,255,963
HYDRAULIC TRANSMISSION
Filed Feb. 7, 1935  4 Sheets-Sheet 2

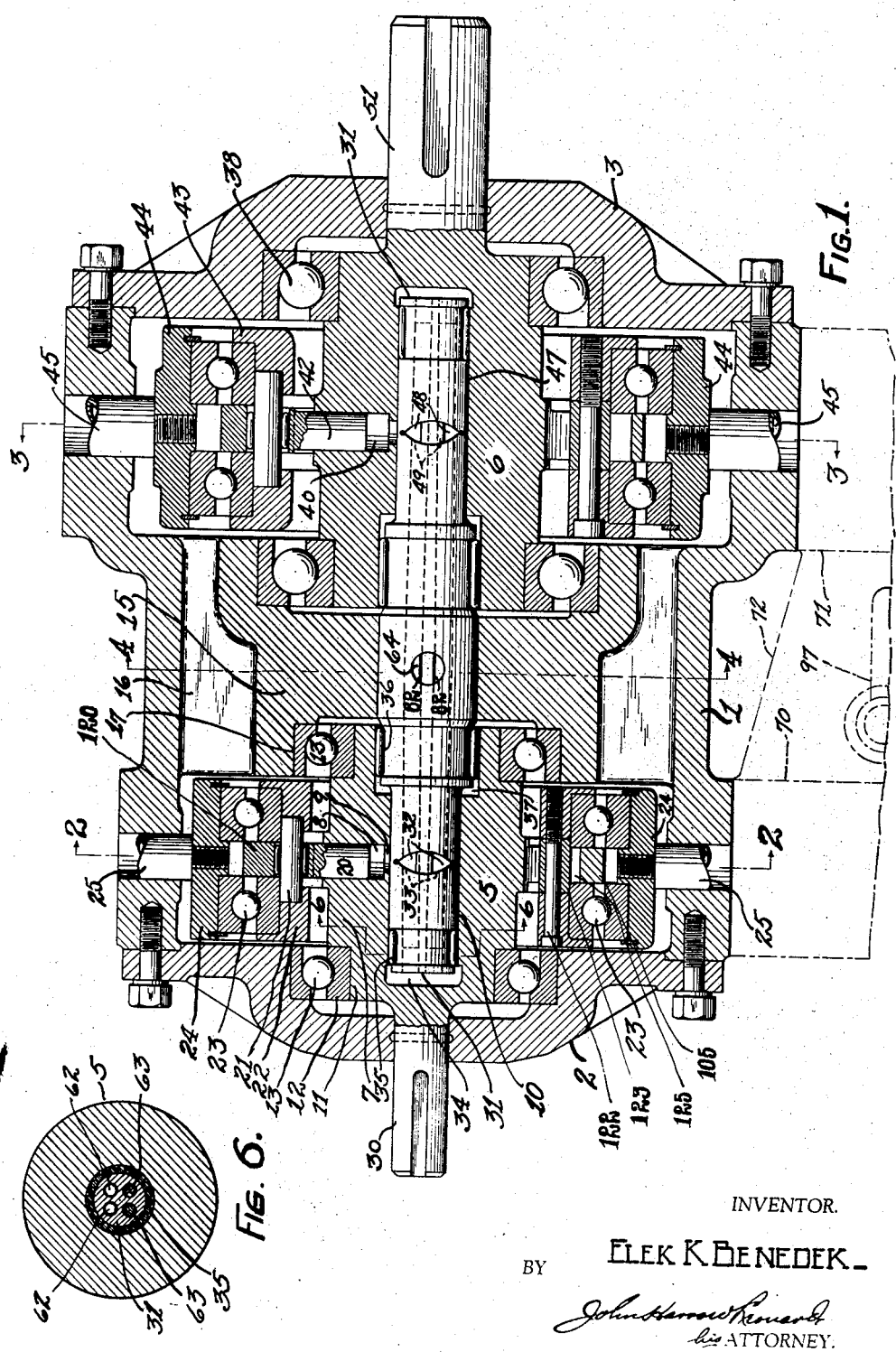

INVENTOR.
ELEK K BENEDEK

BY John Harrow Renard
his ATTORNEY.

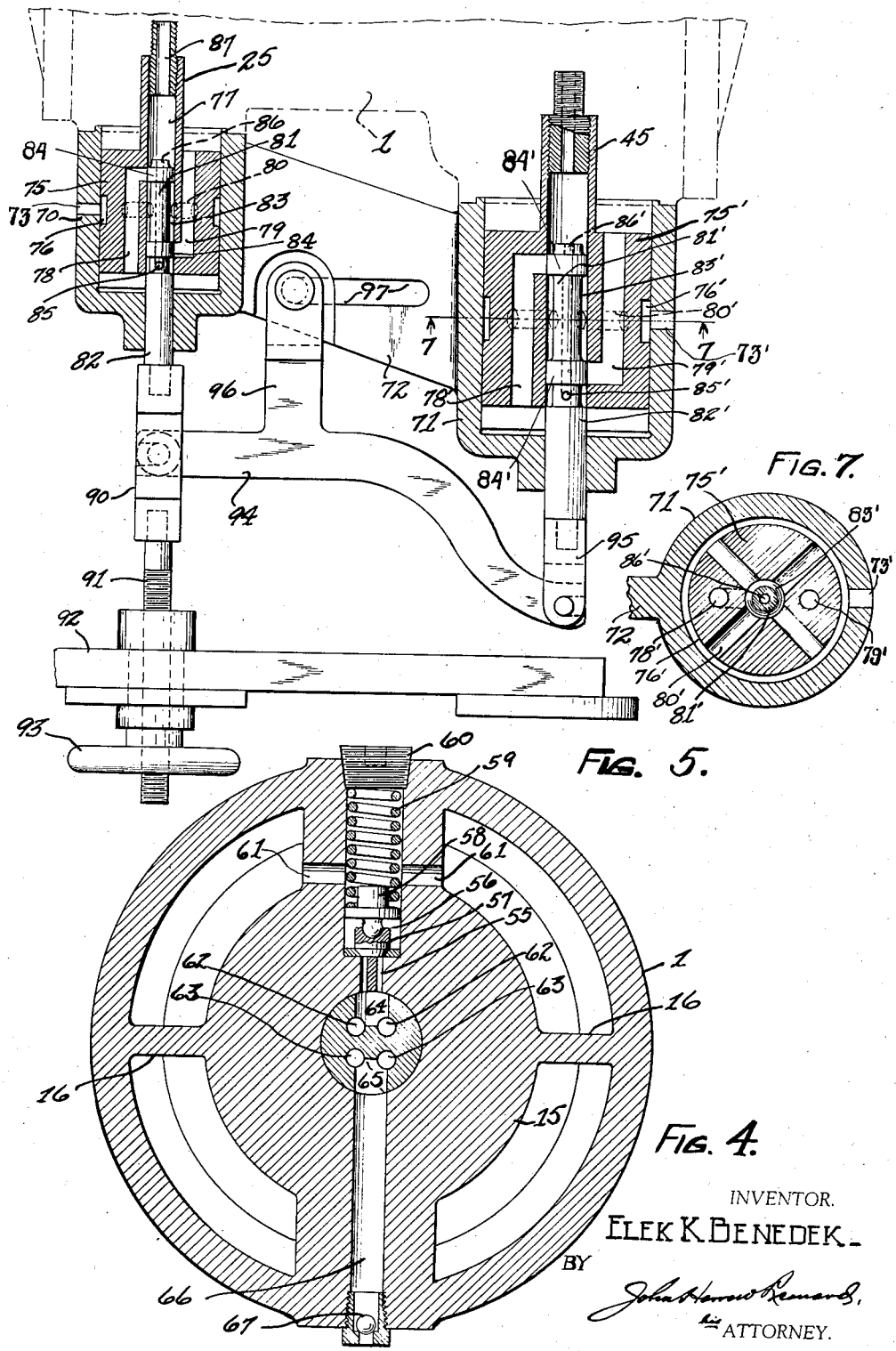

Sept. 16, 1941.   E. K. BENEDEK   2,255,963
HYDRAULIC TRANSMISSION
Filed Feb. 7, 1935   4 Sheets-Sheet 4

INVENTOR
ELEK K. BENEDEK
BY
his ATTORNEY

Patented Sept. 16, 1941

2,255,963

UNITED STATES PATENT OFFICE 2,255,963

HYDRAULIC TRANSMISSION

Elek K. Benedek, Bucyrus, Ohio

Application February 7, 1935, Serial No. 5,429

4 Claims. (Cl. 60—53)

This invention relates to hydraulic variable speed transmissions and particularly to that type of transmission in which the power input is translated by a rotary, radial piston, positive displacement fluid pump into the fluid pressure which, in turn, is passed to a cooperating rotary, radial piston, positive displacement hydraulic motor wherein it is retranslated into torque output for final utilization. Hydraulic transmissions of this general type heretofore known have not met with extensive acceptance in the trade due primarily to certain imperfections and disadvantages inherent in the particular structures and designs employed. Chief among these disadvantages are the low efficiency of output relative to input and the limited range of speed, power and torque ratio.

One of the principal objects of the present invention is to provide a greatly simplified transmission of this type in which substantially mechanical and hydrostatic balances are maintained throughout and in which the various working parts are substantially symmetrically arranged with respect to each other.

An equally important object is to provide a hydraulic transmission in which the pump and motor have the same flow characteristics, as a result of which shockless fluid communication between the pump and motor is obtained, that is, the pump and motor have the same general structure so that the resultant flow, velocity and flow acceleration between the pump and pintle ports is such that no pressure impulses are developed between the pump and motor ports in the pintle during operation.

A correlative object is to provide in a hydraulic transmission a pump and a motor such that the motor accommodates exactly the fluid delivered by the pump, receiving the fluid in the same manner as to path, velocity, and acceleration as delivered by the pump instead of at a different rate which would result in entrapment of the fluid in the main pintle passages connecting the pump and motor.

Another object is to provide a simplified and more highly efficient fluid circuit in a transmission of this character.

Still another object is to provide in a hydraulic transmission a completely anti-friction pump and a completely anti-friction motor so connected in the circuit that for any given delivery of the pump, the motor may be operated from maximum stroke in one direction entirely to the zero stroke and to maximum stroke in the reverse direction while maintaining a high efficiency throughout the range of operation.

Still another object is to provide a closed circuit by which the pump and motor are hydraulically interlocked during rotation as a result of which neither leads nor lags with respect to the other but, on the contrary, any change in the operation of one is immediately reflected in the other.

Another object is to reduce the number of working parts by utilizing certain necessary parts in new relations to each other to perform functions in addition to those functions for which such parts have been used heretofore.

Still another object is to provide a transmission having a pump and motor so connected together operatively as to maintain a better hydrostatic balance between the two and between their respective working parts and thereby to reduce the frictional forces and bending moments among the working parts to such a degree that substantially the entire input of the mechanism may be utilized in creating useful output.

Another object is to provide a pump and motor combination in a transmission of this character in which the cooperation between the respective reactance means and piston assemblages of both the pump and the motor can be controlled independently of each other so that a much wider range of speeds and torque transmission and combinations of speed and torque for any given power input can be obtained.

A more specific object is to provide in a hydraulic transmission a pump and a motor both of which are of the reversible variable displacement type in which the stroke changing mechanisms, and therefore the control of final delivery, of each may be operated independently of the other.

Another object is to provide a dual stroke changing mechanism for a pump and motor combination of this character which cooperates with the two in a manner to coordinate the stroke changing mechanism of one with respect to the other so that a very wide range of speeds and torque necessary in connection with many industrial machines may be provided easily and efficiently by conveniently arranged adjustments readily accessible to and operable by the operator of the particular machine.

Having in mind the problems presented and conditions to be met in the practical field, other advantages in connection with this invention include a transmission by which a commercial range of speed ratios between the speed of the shaft of the power input mechanism shaft and the speed of the shaft of the motor of the transmission may be obtained with a single stage unit while maintaining an overall efficiency of transmission of from 80 to 95%, depending on the size of the transmission. By "commercial" range is meant the range of speeds required by general commercial utility. Another advantage resides in the comparatively small overall size required which has been reduced about 50% over prior mechanical gear transmissions.

Other objects and advantages will become apparent from the following specification wherein reference is made to the drawings in which—

Fig. 1 is a horizontal longitudinal sectional view of a hydraulic transmission mechanism embodying the principles of the present invention and is taken on a horizontal plane through the axis of rotation, as indicated by the lines 1—1 in Figs. 2 and 3, the spider of the partition wall and the pintle being shown in plan view for purposes of clearness;

Figs. 2 and 3 are vertical cross sectional views of the pump and motor respectively of Fig. 1 and are taken on planes indicated by the lines 2—2 and 3—3 respectively of Fig. 1;

Fig. 4 is a vertical cross sectional view of the transmission taken on a plane indicated by the line 4—4 of Fig. 1;

Fig. 5 is a horizontal sectional view of a coordinating control mechanism for adjusting the speed and torque delivery of the transmission;

Fig. 6 is a vertical sectional view of a portion of the pump rotor and pintle and is taken on a plane indicated by the line 6—6 of Fig. 1; and Fig. 7 is a vertical cross sectional view taken on a plane indicated by the line 7—7 in Fig. 5.

Figure 3:
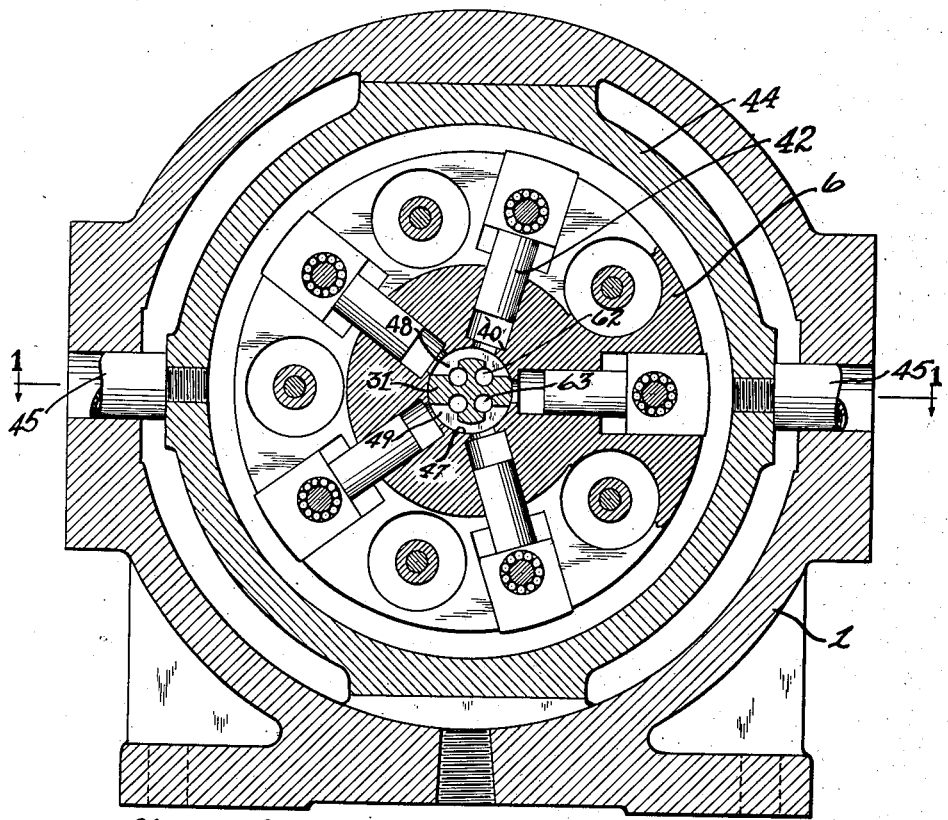

Referring particularly to Fig. 1, the transmission is mounted in a body comprising a casing 1, closed at the ends by rigid load and thrust supporting cover plates 2 and 3 respectively.

Mounted within the body near one end thereof is a pump rotor 5 of the rotary radial piston type. Rotatably mounted near the opposite end of the body is a rotor 6 which also is the rotary, radial piston type and, in fact, except for its larger size, is a substantial duplicate of the pump rotor 5. Accordingly, therefore, only the rotor 5 will be described in detail. It should be noted that the designations of the rotor 5 as the pump rotor and the rotor 6 as the motor rotor are primarily for convenience in description as either may comprise the pump and the other correspondingly comprise the motor, both being completely reversible.

The rotor 5 comprises a rigid radially extending body portion 7 in which is provided a series of radial circumferentially spaced piston cylinders 8, each of which cylinders has a radial valve port 9 opening into an axial bore 10 of the rotor, later to be described. The rotor is provided at each end of the body portion 7 with annular hubs 11, the hubs having axial annular faces which receive the inner races 12 of anti-friction bearings 13, the hubs 11 being coaxial and of the same external diameter so that the bearing sets respective thereto shall be coaxial with the rotor and the same distance radially from the rotor axis of rotation.

The body portion 7 of the rotor 5 is provided with radially extending annular shoulders adjacent each hub which shoulders may engage the inner edges of the bearing races 12 so as to transmit any axial thrusts on the rotor into the bearings. It should be noted that the sets of bearings at the respective ends of the rotor are spaced longitudinally of the rotor equidistant from the plane of the cylinder axes so as to maintain as effective mechanical balance of the rotor as is practicable. The outer race of the sets of bearings 13 at the end of the rotor adjacent the cover 2 is securely mounted in an internal annular recess in the cover 2 to transmit directly to the cover any axial outward thrusts and radial thrust of the motor. At the opposite or inner end of the rotor 5, within the body, is a rigid partition or supporting wall 15, integral with or fixedly secured within the casing 1 by radial spider arms 16. The supporting wall 15 terminates longitudinally close to the adjacent end of the rotor body and is provided with an internal annular recess 17 corresponding to and coaxial with the recess in the cover 2 for receiving the outer race of the set of bearings 13 at the inner end of the rotor and for supporting the rotor at its inner end against axial thrust and radial thrusts. It should be noted that both the bearing races 12 and their complementary outer races are so grooved as to transmit axial thrusts from the rotor 5 through the races and the bearings 13 to the end cover 2 and supporting wall 15 respectively.

Carried by the rotor, in the cylinders 8, are a plurality of radial pistons 20 each of which is connected through the medium of a crosshead pin 21 to the secondary rotor 22. Suitable circumferential grooves are provided in the secondary rotor and accommodate the end portions of the pins 21 for rolling oscillation along the grooves. Anti-friction capillary needle bearings are provided and snugly fit between each pin 21 and the piston head in engagement therewith, for maintaining lubrication of the working parts, reducing friction therebetween and for eliminating transverse rocking of the piston.

Figure 2:
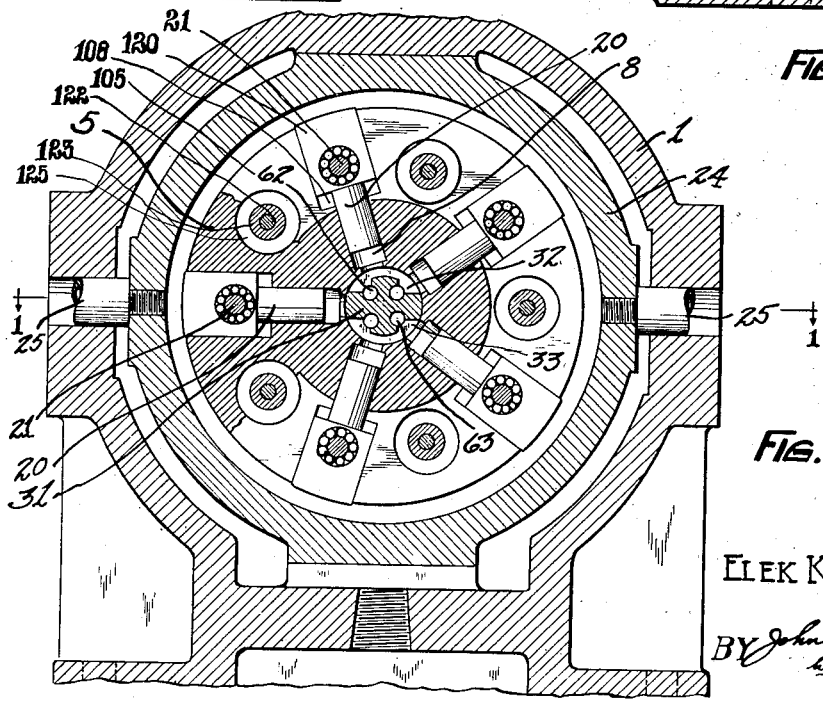

The secondary rotor 22 is supported within the body 1 through the medium of anti-friction bearings 23 and a surrounding annular reactance housing 24. The secondary rotor 22 and the reactance housing 24 are coaxial with respect to each other and the housing 24, in turn, is mounted in suitable guideways, shown in Fig. 2, in the body 1 so as to support and maintain the secondary rotor with its axis parallel to the axis of the primary rotor while permitting shifting of the secondary rotor and its housing to change the relative eccentricity of the primary and secondary rotors and thereby vary the length of stroke of the pistons. The sets of bearings 23 are preferably spaced equidistant from each other at opposite sides of the plane of the piston axes.

The space between the sets of bearings is occupied partially by the heads of the pistons during reciprocation thereof, and is open to permit lubricant introduced through the housing 24 to pass to the bearings 23, the parts of the piston assemblages, and the needle bearings of the pistons. The shifting of the secondary rotor and housing 24 may be accomplished through the medium of any suitable control means, for example, control rods 25, later to be described in detail, through which lubricant may be introduced through the housing wall. The rotor 5 is provided with a radial flange 105 in the plane of the cylinders 8, the flange having radial guideways 106 in which crossheads 120 of the pistons 20 are reciprocable. The crosspins 21 of the pistons are mounted in the piston crossheads 120 on capillary cageless needle rollers, such as described in my United States Letters Patent No. 2,074,202, issued March 16, 1937.

The halves of the rotor 22 are connected together by bolts 122 on which are carried sleeve spacers 123 which space the halves a proper distance apart from each other. Suitable openings 125 are provided in the flange 105 for accommodating the sleeve spacers 123 and the bolts 122. The openings 125 are of proper diameter so that the spacers engage the peripheral walls thereof at maximum stroke setting of the rotor 22 and thus transmit torque between the rotors at maximum stroke position.

The rotor 5 carries at its outer end an impeller shaft 30 which extends through the end cover 2 of the body of the transmission and is preferably integral with the corresponding end of the rotor 5. The rotor, as previously mentioned, is provided with an axial, dead end, pintle receiving bore 10 which extends from the end of the rotor adjacent the supporting wall 15 axially beyond the piston cylinders 8 and close to the plane of the outer set of bearings 13.

Fixedly mounted within the wall 15 by press fitting and coaxial with the bore 10 and protruding thereinto is one end of a valve pintle 31 which, in the zone of the valve ports 9 of the bore 10 is hydraulically fitted to the complementary walls of the bore 10. The pintle 31 has the usual valve portion with reversible ports 32 and 33 positioned axially to cooperate with the ports 9 of the primary rotor 5 consequent upon rotation of the rotor. The pintle 31 terminates in spaced relation to the dead end of the bore 10 of the rotor, as indicated at 34, for purposes later to be described.

Adjacent its free end, the pintle is provided with an annular axially extending groove defining a bearing race which accommodates anti-friction capillary needle bearings 35, the wall portion of the bore 10 overlying the bearings 35 forming the complementary race for the needle bearings 35. At the portion of the pintle adjacent the wall 15 and preferably in the same zone axially of the pintle as the bearings 13, the pintle is provided with another axially extending annular surface forming a bearing race for a set of capillary needle bearings 36. At the end of the rotor bore 10, adjacent this portion of the pintle, the bore 10 is counterbored to a slightly larger diameter, the wall of the counterbore providing the external bearing race of the bearings 36. The portion of the pintle forming the race for the bearings 36 is of greater diameter than the valve portion of the pintle and thereby forms a heavy shank extending as near as practicable to the valve portion of the pintle. The bearings 35 are likewise positioned as near as practicable to the opposite end of the valve portion of the pintle. Thus any tendency of deflection of the protruding pintle under hydrostatic load on the valve portion is greatly reduced and resisted by the greater rigidity afforded by its heavy shank and at the same time the hydrostatic load is transferred to the bearings 35 and 36 and therethrough to the rotor mountings and to the body of the transmission. This counterbore, indicated at 37, is of sufficient length to permit axial clearance between its inner end wall and the shank portion of the pintle.

By this arrangement of the pintle, the needle bearings 35 and 36, the bearings 13, and bearings 23 are balanced and symmetrically arranged with respect to the plane of the piston axes and arranged to transmit radial thrusts and axial loads to the rigid fixed portions of the body. Consequently, the primary and secondary rotors and piston assemblages and pintle may cooperate in such a manner that substantially all of the torque transmitted to the rotor through the impeller shaft 30 is translated into hydrostatic pressure and no material portion thereof is misapplied or wasted in creating stresses and bending moments between the primary rotor and the pintle or between the working parts of the rotors and cooperating piston assemblages. Furthermore, since all thrusts are directly resisted by balanced anti-friction means, no excessive frictional resistance between cooperating surfaces is developed.

Referring next briefly to the motor of the transmission, the rotor 6 is mounted at one end in the portion of the wall 15 opposite to that supporting the rotor 5, and at its outer end in the end cover 3, sets of anti-friction bearings 38 cooperating with the wall 15 and end cover 3 respectively and with the rotor 6 in the same manner as the bearings 13 cooperate with the primary rotor 5 being provided. The motor rotor 6 also has a plurality of radial piston cylinders 40 in which are mounted radial pistons 42 cooperable with a secondary rotor 43 in the same manner as the pistons 20 and rotor 22. The secondary rotor, in turn, is mounted in an annular reaction housing 44 corresponding to the housing 24 of the primary rotor. The secondary rotor housing 44 is mounted in the body of the transmission so that it may be shifted in the same manner as the housing 24 for varying the relative eccentricity of the primary and secondary rotors of the motor while maintaining their axes in parallel relation. For this purpose, a rod 45, corresponding in form and function to the rod 25, is connected with the secondary rotor 44 and extends through the adjacent wall of the casing 1.

The mountings and corresponding parts of the rotor 6 are likewise symmetrically disposed with respect to the plane of its piston axes. The rotor 6, in turn, is provided with a dead end axial bore 47. It should be noted that the pump rotor 5 and the motor rotor 6 are so mounted with respect to each other that the respective dead end axial bores 10 and 47 thereof are coaxial with respect to each other and have their open ends toward and adjacent the wall 15. Contrary to the usual practice, a separate pintle eccentric to the pump pintle is not provided for the rotor 6. Instead, the pintle 31, which is mounted fixedly at its midportion in the wall 15, protrudes from this mounting not only into the bore 10 of the pump rotor but correspondingly, from the opposite face of its suporting wall, into the bore 47 of the motor rotor. The latter protruding end of the pintle is mounted in the bore 47 and cooperates with the ports of the piston cylinders 40 of the rotor 6 through reversible ports 48 and 49 in the same manner as the opposite end cooperates with the cylinder ports of the primary rotor. As in the case of the former, the motor end of the pintle likewise has a valve portion hydraulically fitting a corresponding portion of the bore 47 and terminates in spaced relation to the dead end of the rotor bore.

The rotor 6 carries an axially extending torque delivery shaft 51 of the transmission, the shaft 51 preferably being integral with the rotor 6 and extending therefrom through the end cover 3 of the transmission. Insofar as the sizes of the rotors 5 and 6 permit they are balanced not only as among their own respective working parts but also with respect to the midportion of the pintle 31 so that neither tends to exert undue stresses on the pintle which would tend to rock it out of its axial position due to overbalance at either end. Since both protruding ends of the pintle and both rotors are so mounted that all mechanical and hydrostatic thrusts thereon are transmitted to the casing, true alignment and efficient operation is assured.

Referring next to Fig. 4, the supporting wall 15 in which the pintle is mounted is provided with a radial bore 55 and a communicating coaxial enlarged counterbore 56. At the juncture of the bores 55 and 56, a valve seat is formed on which is seated a relief valve plug 57 which, through the medium of a force directing head 58, is held firmly in place by a compression spring 59 of predetermined strength. The outer end of the bore 56 is sealed by a suitable screw plug 60 against which the end of the spring 59 abuts. Extending laterally from the bore 56 are discharge ducts 61 which communicate with the interior of the body of the transmission mechanism.

The pintle is provided with the customary longitudinally bored passages or ducts 62 and 63, the former of which communicate with the pintle inlet ports 32 at the pump end of the pintle and with the pintle discharge ports 48 at the motor end of the pintle thus forming the pressure circuit between the pump and motor. The ducts 63 communicate with the pintle ducts 33 and 49 to form the suction circuit between the motor and pump. That portion of the pintle mounted in the wall 15 is provided with a relief port 64 which communicates with the pressure ducts 62 of the pintle and, in turn, communicates with the duct or radial bore 55. Consequently, in event an undue or excessive hydrostatic pressure is created in the transmission beyond that point allowed for safety of the transmission or of a machine tool being driven thereby, the valve 57 will be unseated thereby and relieve the pressure through the medium of the ducts 61 into the interior of the body which provides the fluid sump, designated S in Fig. 8. The pressure which is desired as maximum for any circumstances can be obtained by changing the compression of the spring 59 or changing the spring itself.

Correspondingly, in the same portion of the pintle is a main supply duct or radial bore 65 which communicates with the suction ducts 63 of the pintle and through the medium of a bore 66 in the wall 15 may communicate with a suitable fluid sump or source of supply of fluid. A light check valve 67 operable to admit fluid into the bore 66 and to prevent discharge therefrom when pressure is created in such passage is operatively disposed intermediate the bore and the sump. It is apparent therefore that when the pump is operating, fluid is delivered under pressure through the ports 32 by the pistons 20 and passes through ducts 62 and the ports 48 to the motor wherein it may cooperate with the pistons 42 thereof to drive the motor.

When the motor pistons are brought into alignment with the pintle ports 49, in turn, the fluid is exhausted therefrom under a slight pressure and passes through the ducts 63 into the pintle suction or discharge ports 33 at the pump end of the pintle, a full supply of fluid in the circuit being assured by the check valve 67. The slight leakage or slip of fluid necessarily occasioned will readily be supplied through the valve 67 and any slip fluid in the body subsequently may be drained from the body through the medium of the plugs in the bottom wall thereof, illustrated in Figs. 2 and 3.

As more fully explained in my copending application, Serial No. 754,753, filed November 26, 1934, now Patent 2,126,722, dated August 16, 1938, it is desirable to maintain as near as possible not only hydrostatic balance of the pintle 31 but also, to effect proper lubrication of the bearings between the pintle and rotor. By terminating the pintle in spaced relation to the ends of the bores 10 and 47, as indicated at 34 and 50 respectively, and by introducing fluid thereinto at operating pressure of the transmission, this may be accomplished. In the present instance this is especially desirable due to the fact that a common pintle is provided and any tendency of it to shift, due to high fluid pressure at its ends, would effect an unbalance and inefficient operation of both the pump and motor. The diameters of the respective ends of the pintle are substantially equal. Therefore, if fluid from the pump under the same line pressure is delivered either in the form of slip fluid or through the ends of the passages 62 into the dead ends of the bores 10 and 47 respectively, as indicated at 34 and 50, the total hydraulic reaction on one end of the pintle will be substantially equal to the total hydraulic reaction on the other end and, since these hydraulic reactions will thus be substantially balanced, there is no tendency for the pintle to be shifted axially by an unbalanced total hydraulic pressure. For insuring the same hydrostatic pressure at both ends and permitting it to be discharged as a continuous annular stream over the needle bearings at the respective ends of the pintle, the pressure ducts 62 of the pintle extend beyond their pintle ports 32 and 48 and entirely through the pintle, opening in the ends of the pintle so as to discharge into the dead ends of the bores 10 and 47 respectively. The suction or nonpressure ports 63 are sealed at the ends, as better illustrated in Fig. 6, so that the fluid introduced to the respective rotor bores at the ends of the pintle is not only in hydrostatic balance but is at exactly the same pressure as that maintained for operation of the motor. Any hydrostatic reactance on the rotors at the ends of the bores are resisted by the rotor bearing and the body of the transmission.

The radial and axial hydrostatic balance is made possible by the combination of a pump and a motor in a reversible hydraulic transmission in a one way circuit wherein the pump operates for one way delivery and the motor is freely reversible, as will later be described in connection with the hydraulic circuit.

As previously described, the secondary rotor housings 24 and 44 of the pump and motor respectively are shiftable for varying the relative eccentricity of the corresponding primary and secondary rotors, this shifting being accomplished through the medium of control rods 25 and 45 respectively. In some instances it is desirable to adjust the speed ratio and torque desired by shifting the respective reactance housings concurrently in a predetermined relation to each other during the operation of a particular machine driven by the transmission or for a particular kind of work. For example, assuming that the motor is set at a given eccentricity and there maintained, the setting of a greater eccentricity on the pump would provide a larger flow of fluid but at lower pressure than would a lesser eccentricity on the pump, the latter decreasing the volumetric discharge of the pump while increasing the pressure. Consequently, by varying the eccentricity of the pump only, a high speed with a correspondingly high torque delivery of the motor could not be obtained. Reversely, if the pump were driven at predetermined adjusted eccentricity and the eccentricity of the motor adjusted, a greater eccentricity of the motor would produce a slower speed but a greater torque, while the lesser eccentricity on the motor would produce a higher speed but lesser torque. It is apparent therefore that if only one reactance means of the transmission is adjustable, increase in speed can be obtained only by a sacrifice in torque delivery and conversely increase in torque delivery can be obtained only at a sacrifice of speed even within normal practical requirement ranges of speed and torque. With both reactances adjustable, however, an unlimited number of additional different combinations are obtainable. For instance, a high speed and low idling torque could be obtained by setting the pump at comparatively low eccentricity and the motor at a very low eccentricity. For the same speed and concurrent higher torque, the pump could be set at a somewhat higher eccentricity and at the same time a much greater eccentricity provided at the motor, thus the loss in speed for greater torque in the motor could be offset by the larger flow provided from the pump. By increasing the eccentricity of either the pump or motor reactance and decreasing the eccentricity of the other unit concurrently, a double acceleration or deceleration in speed delivered by the motor is obtained and also high speed, low torque or low speed, high torque and an infinite number of intermediate combinations of speed and torque are available. These changes in speed and torque are effected by a continuous rise and fall instead of in the step by step stage as in mechanical transmissions. The eccentricity of the pump and motor may be independently controlled by any suitable control means. For purposes of illustration, however, and since within certain limits the combinations desired are well known and are kept during the entire operation, it is desirable that a control means be provided for coordinating the setting of the reactances. For the purpose of illustration, substantially duplicate hydraulically operated controls are provided for the pump and motor, these controls being operatively connected to each other so that they are operated from a common source and will maintain predetermined relations between the eccentricities of the respective rotors. The principles of each control are more fully set forth in my co-pending application, Serial No. 749,746, filed October 24, 1934, now Patent 2,111,659, dated March 22, 1938.

Referring more specifically to Figs. 1, 5 and 7, the transmission body is provided with housings 70 and 71 connected together by a suitable flange 72, the housings each comprising hydraulic cylinders of one control unit, that for the pump being the housing 70 and that for the motor being the housing 71. Since the controls are identical in form and operation and vary only slightly in size, the control associated with the pump only will be described in detail, the corresponding parts of the control associated with the motor being designated by corresponding primed numerals and not specifically described.

Referring particularly to Figs. 5 and 7, the housing 70 comprises a piston cylinder in which is received a reciprocable piston 75, the cylinder and piston head being so arranged relative to the transmission as to move axially of the shifting rod 25 of the pump reactance housing. In the form illustrated, the rod 25 is, in fact, the stem of the piston 75. The piston head 75 is elongated axially and intermediate its ends is provided with a suitable inlet from a source of fluid under pressure, the fluid to be introduced into the housing 70 at the midportion thereof through a port 73 and in alignment with an external annular groove 76 on the piston head. The piston head is provided with an axial bore 77 with which communicate at longitudinally spaced points ducts 78 and 79 of the piston head, the duct 78 opening at one end of the piston into the cylinder housing 70 and the duct 79 opening through the other end of the piston head into the housing 70. In addition a plurality of ducts 80 communicate with the groove 76 and with the bore 77 of the piston for transmitting fluid under pressure thereinto. Disposed in and reciprocable longitudinally along the bore 77 is a pilot valve piston 81, the pilot piston being shiftable axially along the bore 77 through the medium of an operating rod 82. The pilot valve is provided intermediate its ends with an elongated annular reduced portion so as to form with the wall of the bore 77 an annular pocket 83 positioned so as to always be in communication with the ducts 80. At the ends of and defining this annular portion are enlarged valve portions 84 which, when the pilot valve is disposed in the intermediate position, block the entrances of the ducts 78 and 79 respectively. However, when the pilot piston is shifted downwardly in Fig. 5, it is apparent that the corresponding valve portion 84 thereof will move out of alignment with the end of the duct 78 so as to permit communication between the duct 78 and the bore 77. Also it will block the passage of fluid from the annular channel 83 into the duct 78 and into the end of the pilot piston bore 77 adjacent the rod 25. At the same time, the other valve end 84 will have passed downwardly beyond the opening of the duct 79 into the bore 77, so as to connect this duct with the channel 83. Therefore fluid under pressure will pass from the channel 83 through the duct 79 into the upper end of the piston cylinder 70 while at the same time free discharge of fluid from the cylinder at the opposite end of the pistons is provided through the duct 78 and passage 77. Obviously, therefore, the piston will be driven downwardly by hydrostatic pressure. If the pilot piston 81 is shifted upwardly or in the opposite direction the duct 78 will be connected with the channel 83 so as to admit fluid under pressure thereinto for moving the piston head 75 in the opposite direction. In order to vent the opposite side of the cylinder in such instance, a vent 85 is provided in the pilot piston beyond the adjacent valve portion 84 toward the rod 82, this vent communicating with an axial duct 86 in the pilot piston which discharges into the duct or passage 77. The vent 85 is so located relative to the piston head and pilot piston 81 that it is disconnected from any other ducts except in the position last described.

The operation of the pilot control is as follows. Upon movement of the rods 82 and 95, the pilot valve pistons 81 and 81' are moved to form a connection for admitting fluid under pressure from the source of supply to the cylinders 70 and 71 which moves the pistons 75 and 75' until the valve heads 84 and 84' close off the passages 78 and 79 and the passages 78' and 79' respectively. Accordingly, the movement of the rods 25 and 45 in each direction and consequently the movement of the reactance housing 24 and 44 will be proportional to the adjustment or setting of the pilot valve pistons.

In order to utilize the oil or hydrostatic fluid used to operate the piston head 75, the rod 25 is provided with a connecting end 87 which is of sufficient length to be screw fitted into the reactance housing 24 of the pump and extend entirely therethrough radially. This connecting end portion 87 is provided with an axial duct, as illustrated, which communicates with the passage 77 and is open at its opposite end. Thus all hydraulic fluid bled into the passage 77 will be discharged into the interior of the body 1 and, in the form illustrated, through the reactance housing 24 onto the pistons 20, the bearings 23, the bearings of the piston crosspin 21 and other adjacent parts. The control assemblage in the housing 71 is identical except for size, the corresponding parts being designated by corresponding primed numerals, and discharges through the rod 45 in a corresponding manner with respect to corresponding parts of the motor.

In order to operate the pilot pistons and thereby vary the eccentricity of the pump and motor in a desired relation to each other, a connecting element 90 is secured to the rod 82 of the pilot piston 81, and a threaded rod 91, in turn, is secured to the connecting element 90 and received in a suitable bore in the frame 92 of the mechanism. A complementarily threaded hand wheel 93 is provided for moving the rod 82 axially to the desired position. Pivotally mounted in the connecting element 90 is a coordinating lever 94 which extends to and is pivotally connected to the operating rod 95 of the motor control pilot piston. Intermediate the ends of the lever 94 is an element 96 which is pivotally secured in the flange 72 on which the housings 70 and 71 are mounted, a slot 97, elongated toward the controls, being provided in the flange 72 so that the fulcrum or pivot point of the element 96 may be shifted. By shifting this fulcrum, the desired relation between the controls may be adjusted for the particular need. Obviously, as the control rod 82 is drawn outwardly the control rod 95 for the motor will be correspondingly thrown inwardly, thus an increase in eccentricity in either the pump or motor may be accompanied by a decrease in eccentricity in the other. Thus once having determined the desired relation and set the fulcrum accordingly, this relationship is afterwards maintained for different speeds by the setting of the single hand wheel 93.

Figure 8:
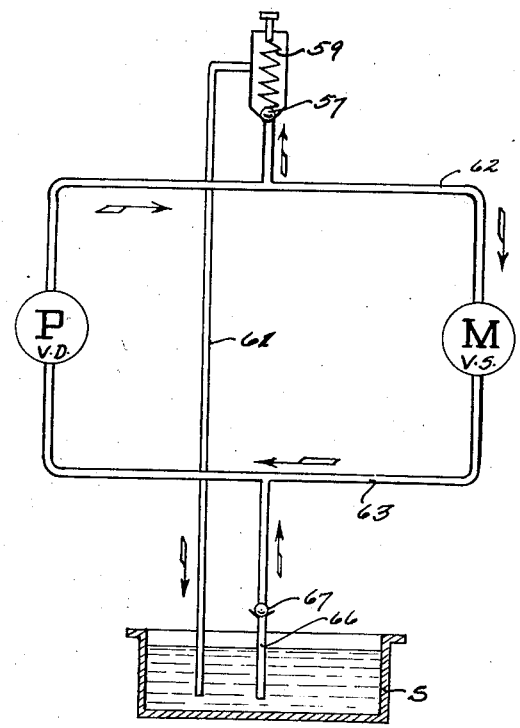
Fig. 8 is a diagrammatic illustration of the fluid circuit of the present transmission.

Referring next to Figs. 1, 4 and 8, the advantages of the present structure should be noted. As heretofore described, the pump barrel is antifrictionally mounted in the casing. It is also in anti-friction cooperation with the pintle. The crosspins, in turn, are in anti-friction cooperation with the pistons and are in rolling oscillating engagement with a reactance means which is likewise anti-frictionally mounted. Thus a completely anti-friction pump is provided. The same is true as to each of the corresponding parts of the motor. Furthermore, both pump and motor are of the same general characteristics, preferably having the same number of pistons and cooperating in the same manner with the pintle. Since the valve 57 is closed except for unusual pressures which may be inadvertently developed and since the valve 67 opens only to admit replacement fluid from the body which provides a sump, indicated by the letter S in Fig. 8, both the pump and the motor are hydraulically interlocked by the simple circuit. Furthermore, there is no abrupt change in the direction of flow of the fluid delivered by the pump as it passes directly to the motor and the discharge pressure of the motor, in turn, discharges directly to the pump, insuring complete and instant filling of the cylinders thereof. Thus a continuous flow through the circuit utilizing the initial flow velocities of the fluid as it leaves the pump or motor is provided. Due to the anti-friction construction of both the pump and motor, cooling of the fluid by passing it from the circuit into extraneous cooling devices is unnecessary as no wasteful heat is developed. Since no wasteful heat is developed, a given speed and setting of the motor and pump will remain constant during long periods of operation.

Since the pump is an entirely anti-friction structure, its efficiency remains high regardless of the stroke, as distinguished from prior structures wherein sliding shoes are used to operate the pistons or sliding cooperation is provided between the various parts. In such prior structures, sliding shoes or other sliding frictional surfaces tend to bind the pump at high pressures and maximum strokes with the result that the total input of power is wasted and utilized only in overcoming frictional resistances. What is true for the pump is even more true for the motor. Prior structures, none of which are completely anti-friction, when used as a motor will bind and lock frictionally as the short stroke position is reached. Most such structures, when used as motors, completely lock at about one fourth stroke. Once having locked the static friction becomes effective and it is impossible to start the motor again. Consequently all such prior structures have relied upon a reversible pump for reversing the operation, but a reversible pump required a very complicated fluid circuit. For example, if the stroke of the motor should be reduced to about one fourth stroke, additional reduction would cause locking or such a great reduction in efficiency that no power would be delivered. Thereupon the motor would fail to accommodate the delivery of the pump and fluid would be entrapped creating excessive pressures and vibrations.

Obviously, in such a structure the motor could not be adjusted from maximum stroke to zero stroke and therebeyond in the opposite direction for effecting reversal of the motor. In fact static friction once having become effective the only solution would be to stop the pump and in some manner relieve the pressure of the fluid and then again start the apparatus.

By virtue of the completely anti-friction motor the present circuit can be utilized wherein the eccentricity of the motor can be adjusted from maximum stroke to zero stroke in either direction. Thus in operation, without any change in the direction of flow of the fluid in the circuit, the motor may be operated at maximum eccentricity or stroke and, while maintaining any predetermined adjustment of the pump stroke, the motor stroke may be reduced gradually increasing the speed until the motor stroke is set to zero and during this reduction the motor will accommodate the entire output of the pump without entrapment of any fluid until the actual zero stroke position of the motor is reached. At this point the valve 57 opens, relieving the pressure, but immediately upon continued movement of the reactance means of the motor to dispose it eccentrically at the opposite side of the pintle, the motor will begin operation in the reverse direction, the valve 57 closing. Thereafter the motor may be increased to maximum stroke in such opposite direction. The reversal of the motor in this manner is accompanied only by a slight popping noise due to opening and subsequent closing of the valve 57. During all operation the valve 57 necessarily remains closed unless the circuit requires replacement fluid.

A decided advantage of this structure and circuit is in transmission for vehicles because of the fact that a positive but hydraulically elastic connection is provided between the power and driven shaft. Safety and efficiency are likewise provided and the motor can be effectively used for braking merely by setting the pump to neutral. Since both pump and motor are of the same general design and completely antifriction, it is apparent that either can be used as a pump or motor, each being reversible. This is necessary for shockless flow of fluid. For example, if the efficiency of the motor changed rapidly, whereas the pump remained constant, shock and pressure rise accompanied by wasteful heat would result. Since both have the same flow characteristics, however, such effects are never present.

In the present structure a wide range of starting speed, starting torque and a wide range of static torque and running torque are provided. Thus the present transmission meets commercial requirements, whereas a great reduction in the efficiency of either the pump or motor or a radical change in efficiencies of one with respect to the other would render the device so inefficient in regard to range and use that it could not compete favorably with mechanical transmissions.

Due to the great range of flexibility of torque and speed combinations, great savings in weight and size over mechanical transmissions of comparable range are effected. Since all parts are balanced mechanically and hydrostatically, closer fits of the working parts resulting in production of higher pressures and greater efficiency are obtained. Finally, due to proper surface film lubrication and use of proper bearings, hardened, high polished steel and alloy parts may be used with such slight clearance that the clearance space between the working faces is sealed by the lubricant, additionally increasing efficiency, reducing wear, and assuring smoother and longer operation.

Having thus described my invention, I claim:

1. In a hydraulic transmission mechanism including a hydraulic radial piston pump having a piston carrying rotor, pistons reciprocable radially therein, an adjustable reactance means cooperable with the pistons to reciprocate the same consequent upon rotation of the rotor, and a reversible hydraulic radial piston motor having a piston carrying rotor, pistons reciprocable therein, an adjustable reactance means cooperable with the motor pistons, means respectively for adjusting the motor reactance means and the pump reactance means, control means operatively connected to both the motor and pump adjustment means for moving said adjustment means concurrently to different adjusted positions in predetermined relations in respect to each other, and means cooperable with the control means to adjust and set the same for effecting different predetermined adjusted relations between the adjustment means consequent upon operation of the said control.

2. In a hydraulic transmission apparatus of the character described having a piston carrying pump rotor and a piston carrying motor rotor, each of said rotors having an axial dead end bore and valve ports opening thereinto, means rotatably mounting said rotors in the apparatus with said bores coaxial with respect to each other, a fixed support in said apparatus, a stationary valve pintle fixedly mounted intermediate its end in said support and protruding from its point of connection at each end, the protruding end portions of the pintle being coaxial with and received with a hydraulic fit within the respective coaxial bores of the rotors, each end portion of the pintle having inlet and discharge ports cooperable with the ports of the rotors associated therewith, the pintle having longitudinally extending ducts, one communicating with the pintle inlet port at the pump end of the pintle and with a pintle discharge port at the motor end of the pintle, the other communicating with a pintle discharge port at the pump end of the pintle and with a pintle inlet port at the motor end of the pintle, said first mentioned duct extending through the pintle beyond said ports and opening into the dead ends of both the rotor and pump bores, and the last mentioned ducts being unconnected with the dead ends of the rotor bores.

3. In a hydraulic transmission apparatus of the character described having a piston carrying pump rotor, a piston carrying motor rotor, series of radial piston cylinders respective to the rotors, pistons reciprocable in the cylinders respectively, each of said rotors having a dead end axial bore and valve ports opening into said bore in spaced relation to the dead end thereof and communicating with the respective cylinders thereof, a valve pintle, means fixedly supporting the pintle intermediate its ends, the end portions of the pintle protruding from the support coaxial with respect to each other, and being received in the respective dead end bores of the rotors and fitting hydraulically therein at one portion, said pintle terminating at its ends in spaced relation to the dead ends of the dead end bores of the rotors respectively, valve ports respective to the pintle end portions positioned for cooperation with the cylinder ports of the respective rotors, duct means connecting certain pintle ports of one end with corresponding ports at the other end for passing fluid under operating pressure therebetween, and said pintle having duct means opening into the dead end portions of both rotors and communicating with the first mentioned duct means.

4. In a hydraulic transmission apparatus having a pair of radial piston carrying rotors, each rotor having an axial dead end bore and a plurality of radial cylinders and each cylinder having a valve port opening into the bore of its respective rotor and means rotatably supporting the respective rotors with the dead end bores thereof coaxial and opening toward each other, a stationary pintle, means fixedly supporting said pintle at a portion intermediate its ends, the protruding end portions of the pintle being coaxial with and protruding into the dead end bores of the respective rotors and received therein with a hydraulic fit and terminating in spaced relation to the dead ends of the bores respectively, valve ports in the protruding portions of the pintle, each end portion of the pintle having an inlet port and a discharge port cooperable successively with the cylinder ports of the rotor with which it is associated, consequent upon rotation of such rotor, said pintle having a longitudinally extending pressure duct connecting the pintle inlet port at the pump end of the pintle with the pintle outlet port at the motor end and a longitudinally extending suction duct connecting the pintle outlet port at the pump end with the pintle inlet port at the motor end, said suction duct being unconnected with the rotor bores except at the valve ports, and said pressure duct communicating with both the rotor bores at the dead end portions thereof.

ELEK K. BENEDEK.